June 25, 1946.  J. G. AZAR  2,402,720
ANIMAL TRAP
Filed May 18, 1943
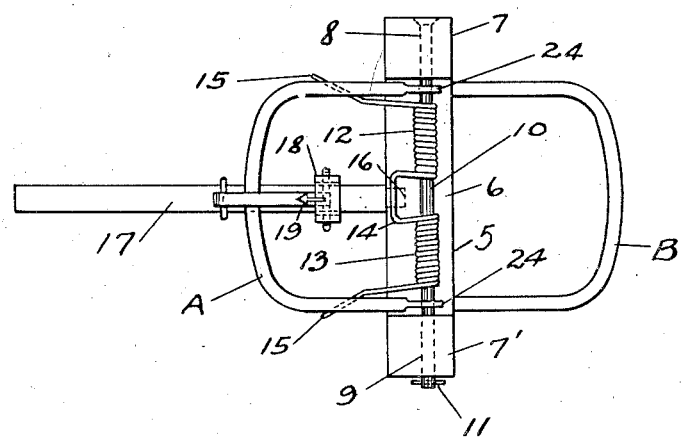
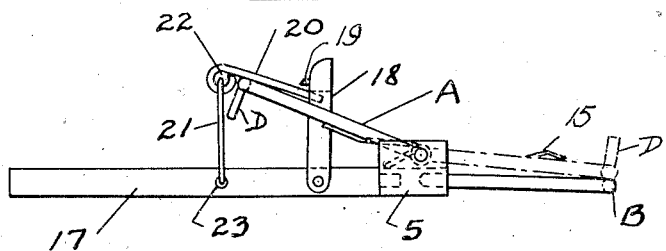
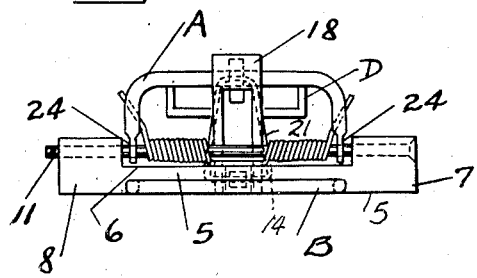
INVENTOR.
JOHN G. AZAR
BY Edward C. Healy
ATTORNEY Patented June 25, 1946

2,402,720

UNITED STATES PATENT OFFICE 2,402,720

ANIMAL TRAP

John G. Azar, Oakland, Calif.

Application May 18, 1943, Serial No. 487,483

2 Claims. (Cl. 43—81)

This invention relates to improvements in traps and has particular reference to a trap embodying novel means for springing or tripping the same, spring means for actuating the trap, and a weighted base that acts as a positive support for the trap, when it is in a rodent or like animal snaring position.

A further object of the invention is to provide a trap of the character described that is simple in construction, economical to manufacture, and a trap that may be easily and readily handled, conveniently transportable, and further a trap that is most durable and also highly efficient in use.

An additional object of the invention is the provision of a handle or hand hold to one of the trap sections to thus facilitate the manipulation of that section in setting the trap.

Other objects and advantages will be apparent during the course of the following description:

In the accompanying drawing forming a part of this specification and in which like numerals are employed to designate like parts throughout the same:

Fig. 1 is a top plan view of the trap disclosing the same in a set position;

Fig. 2 is a side elevation of the same; and

Fig. 3 is a rear elevation of the trap.

In the accompanying drawing wherein for the purpose of illustration is shown a preferred embodiment of the invention, the trap includes a central wooden cross-piece 5, cut away as at 6 and thus providing enlarged ends 7 and 7'.

It will be noted that ends are bored as at 8 and 9 in which there is fixed an elongated bolt or pin 10, the head of the bolt being positioned in the end 7 and the terminus or lower portion of the bolt in the end 7' and secured therein by a cotter pin or like fastening 11. The said bolt is sufficiently raised above the cut-away portion of the cross piece to allow a pair of coiled springs 12 and 13 to encompass the rod, the inner ends of the springs being connected by a loop 14 that contacts the front of the surface of the portion 6, while the free ends 15 of the respective springs engage a portion of the loop of a movable trap section A.

To give proper balance to the trap and to afford a means for supporting the trigger mechanism, I have positioned at right angles to the cross piece 5 and have secured medially therein the reduced end 16 of an elongated rectangular metal bar 17. To said bar 17 there is pivoted a slotted yoke member 18, equipped adjacent its upper end with a hook 19 on which the bait is positioned, while a flat trigger member 20 has the upper end of a looped cord 21 connected to its eye 22, the lower end of the cord passing through an opening 23 formed in the bar 17. It will be noted that the lower end of the trigger is in frictional contact with the slotted yoke.

The trap section A, it will be observed, is of a loop formation and has its ends pivoted as at 24 to said bar 10 and comprises one jaw of the trap, the opposite jaw consisting of a stationary loop B, the ends of which are fixed in the cross member 5.

In the actual use of the device, the trap section is preferably placed adjacent a rock or like obstruction, so that it will be necessary for the rodent or other animal to approach the right hand side of the trap as it appears in Fig. 1.

In the new operation of the device when the trigger is set and bait has been placed on the hook of the yoke 18, the tripping of the trigger will cause a release of the trigger from beneath the yoke 18 and thus under the influence of the coiled springs, the trap section will assume its dotted line position of Fig. 2, with the rodent or like animal caught between said trap section and the stationary loop or jaw B.

To facilitate manipulation of the movable trap section A, when it is desired to set or reset the trap, I have welded or otherwise secured handle D to said section.

The position of the handle is illustrated to advantage in Figs. 2 and 3.

It is to be understood that the form of my invention herewith shown and described is to be taken as a preferred example of the same and that the various changes relative to the material, size, shape and arrangements of parts may be resorted to without departing from the spirit of the invention or the scope of the subjoined claims.

Having thus described my invention, I claim:

1. A trap embodying in its construction a base member, an elongated pin carried thereby, a stationary jaw secured to said base member, said trap having animal restraining means including a spring controlled jaw pivoted to said pin, and said jaw being equipped with a handle, a flat elongated supporting bar secured to said base member and at right angles thereto, a trigger mechanism carried by said bar and capable of holding said movable jaw in a set position, said mechanism including a bait holding yoke pivoted to said bar, a trigger member connected to said bar and spaced from said yoke member and receivable in said member when the trap is set, and a flexible member connecting said elongated bar with an eye formed in the end of the trigger member.

2. A trap embodying in its construction a base member centrally recessed to provide end bearings, an elongated pin secured in the bearings and spaced from the base member at the recessed portion thereof, a stationary jaw secured to said base member, said trap having animal restraining means including a jaw pivoted to said pin, and said jaw being equipped with a handle, a spring for actuating said jaw, said spring being coiled about said pin and housed within the recessed portion of said base member and having its free ends in engagement with said jaw, a flat elongated supporting bar secured to said base member and at right angles thereto, a trigger mechanism carried by said bar and capable of holding said movable jaw in a set position, said mechanism including a bait holding yoke pivoted to said bar, a trigger member connected to said bar and spaced from said yoke member and receivable in the latter while the trap is set, and a flexible element connecting said elongated bar with an eye formed in the end of the trigger.

JOHN G. AZAR.